United States Patent [19]

Templeton

[11] 4,251,000
[45] Feb. 17, 1981

[54] FRONT AND BACK STACKER FOR HIGH SPEED SORTER/READER APPARATUS

[75] Inventor: William B. Templeton, Howell, Mich.

[73] Assignee: Burroughs Corporation, Detroit, Mich.

[21] Appl. No.: 25,913

[22] Filed: Apr. 2, 1979

[51] Int. Cl.³ ............................................. B07C 5/00
[52] U.S. Cl. .................................. 209/547; 209/566; 209/657; 271/209; 271/176; 271/188; 271/303
[58] Field of Search ............... 209/547, 549, 565, 566, 209/569, 583, 584, 657, 546; 271/209, 303, 176, 188, 305

[56] References Cited

U.S. PATENT DOCUMENTS

| | | | |
|---|---|---|---|
| 399,987 | 3/1889 | Goss et al. | 271/303 |
| 3,087,724 | 4/1963 | Snowdon et al. | 271/188 |
| 3,139,278 | 6/1964 | Maidment | 271/188 |
| 3,252,570 | 5/1966 | Smith | 209/569 X |
| 3,420,368 | 1/1969 | Rosenberg et al. | 209/584 X |
| 3,984,094 | 10/1976 | Stocker | 271/303 |

*Primary Examiner*—Allen N. Knowles
*Attorney, Agent, or Firm*—Delbert P. Warner; Charles E. Quarton; Kevin R. Peterson

[57] ABSTRACT

Demountable, modular, apparatus permitting item/-documents, such for example as checks, to be stacked at high speed on opposite sides of a linear main-line item feed-through pathway. Indicators are included for indicating in which direction, forward, right or left of the main-line pathway an item diverting gate is directed and item position sensing devices are located within and adjacent to the diverting gates. Each demountable module, if more than one is employed, is provided with right and left columnators including concentric roller members disposed between a resilient drive roller. Idler rollers are demountably, replaceably secured adjacent respective drive rollers by resilient flat spring members for ease and efficiency of replacement, repair and/or removal. Each diverting gate includes an LED and phototransistor combination for sensing the passage therethrough of an item. Each diverter gate is moved and controlled by a stepping motor which in turn is provided with indicators indicating visually the physical position of its diverter gate.

12 Claims, 25 Drawing Figures

FIG. 12.
TRACK CONTROLLER ORGANIZATION.

FIG.13.

| | |
|---|---|
| OPERATIONAL / | = SIGNAL PRODUCED BY CONTROLLER WHEN IT IS FULLY OPERATIONAL. |
| DATA | = LINE USED BY UPSTREAM CONTROLLER TO PASS INFORMATION TO DOWNSTREAM CONTROLLER. |
| INTERRUPT | = USED BY A DOWNSTREAM CONTROLLER TO GET THE ATTENTION OF THE CONTROLLER IMMEDIATELY UPSTREAM. |

FIG.14.

| MOTOR POSITION SENSING | | |
|---|---|---|
| POSITION | MOTSENF-R | MOTSENR-R |
| FRONT | 1 | 0 |
| CENTER | 1 | 1 |
| REAR | 0 | 1 |

FIG.15A.

ADDRESS IS ASSIGNED PRIOR TO OR WHILE DOC IS IN ENCODER

FIG.15B.

FIG. 16A. NORMAL SEQUENCE OF OPERATION OF GATE 1 CONTROLLER

FRONT AND BACK STACKER FOR HIGH SPEED SORTER/READER APPARATUS

BACKGROUND OF THE INVENTION

1. Field of the Invention

The present invention relates to item/document reader/sorters of the type capable of optical character recognition (OCR) as well as magnetic ink character recognition (MICR).

2. Description of the Prior Art

Prior art item/document reader/sorter apparatus generally employ an elongated main track or item guideway provided with a plurality of item receiving pockets, bins or receptacles opening angularly outwardly away from the main guideway and only on one side thereof. The selection of pockets, bins or receptacles is accomplished by means of a gate mechanism which remains open to provide a straight through pathway for the sorted items or is moved sideways to divert the item or items out of the main stream, track or guideway and into the selected pocket or receptacle. In order to accommodate a large volume of different items to be sorted to different pre-selected locations, amounts, accounts, etc., it is necessary to increase the length of the receptacle or pocket area of the apparatus. Ultimately, this results in an elongated-train-like grouping of pocket receptacles one after the other creating an unwieldly length and making it difficult for an operator to expeditiously monitor and handle the flow of items therethrough.

It is an important object therefore of the present invention to reduce the length of the overall track employed with item reader/sorters by at least fifty percent effectively increasing the operator monitoring capability and ease of operation.

It is still a further object of the invention to reduce the transport mechanism by fifty percent effectively reducing the overall cost of the sorting apparatus.

Still another important object of the invention is to provide a front and back stacking mechanism for an item reader/sorter wherein both the floor area of occupancy of the apparatus is generally reduced as well as the noise level of the sorting mechanism employed therewith.

BRIEF SUMMARY OF THE INVENTION

The foregoing objects and advantages of the present invention are provided by a novel front and back item stacker wherein a single mechanical modular gate mechanism is utilized to switch documents to either the front or the back pocket or receptacle or to a straight through position. The gate mechanism is normally located so as to permit the passage of documents to other front and back pockets further downstream. This mechanism is contained in a demountable, modular assembly which includes gate selection means, item drive means and means for columnating items effective to prevent aerodynamic buckling, twisting, bending, etc., of flimsy paper documents such as bank checks. The modular assembly is pre-formed as by casting to which the required pressure backup rollers are demountably assembled permitting each front and back stacking module to be serviced by way of easy removal and replacement thereby avoiding having to interfere with the operation and/or assembly of other associated units of the overall apparatus.

The diverting gate assembly is preformed of a material which in a relatively thin configuration becomes transparent to light. To this assembly is added a light emitting diode and phototransistor combination which enables the sensing of the item as it passes between the gate assembly to its ultimate destination, i.e. one of the pockets or receptacles. The diverting gate mechanism is operatively connected to an arcuately, incrementally movable stepping motor, one end of which swings the gate assembly back and forth while the opposite end thereof is provided with an indicating device in the form of an arcuately movable vane, the opposite ends of which move between two oppositely disposed pairs of light emitting diodes and phototransistors to precisely indicate to the associated data processing portion of the operating hardware the exact position or location of the diverting gate with respect to the main track as well as to the individual pocket or receptacle assembly.

Each pocket diverter module includes means for locating the module within the main frame assembly in such fashion that the orientation of the assembly is accurate such that the track preceding and following the specific module will be exactly aligned therewith without adjustment providing an unobstructed straight line item pathway. Additionally, each module includes its own columnating arrangement so that each item that passes to the right or left of the main track assembly is longitudinally bowed effectively rigidifying the item as the item is forwarded into the receptacle. The modular columnation assembly includes a single shaft mounting/demounting arrangement wherein a single bolt is employed to assemble and tie together the columnating rolls as well as the drive rolls in one elongated assembly.

Opposite sides of each modular unit are provided with integral mounting means for receiving a receptacle or pocket flat assembly, each one of which can be pluggably introduced and removed with respect thereto so that operator handling of these units is efficient and easily accommodated to repair and cleaning.

DETAILED DESCRIPTION OF THE INVENTION

High speed reader/sorter apparatus has traditionally been large, bulky, complex, fairly unweilding, and space consuming. Operator attendance requires visible surveillance over a fairly long item pathway which tends to make observational checking, i.e. destination of items, jam location, and general receptacle status, very difficult.

The present invention obviates these and other associated problems by providing apparatus which occupies only half as much length as traditional reader/sorter apparatus while increasing the item throughput speed and simultaneously assuring easy operational surveillance and access.

Figure 1:
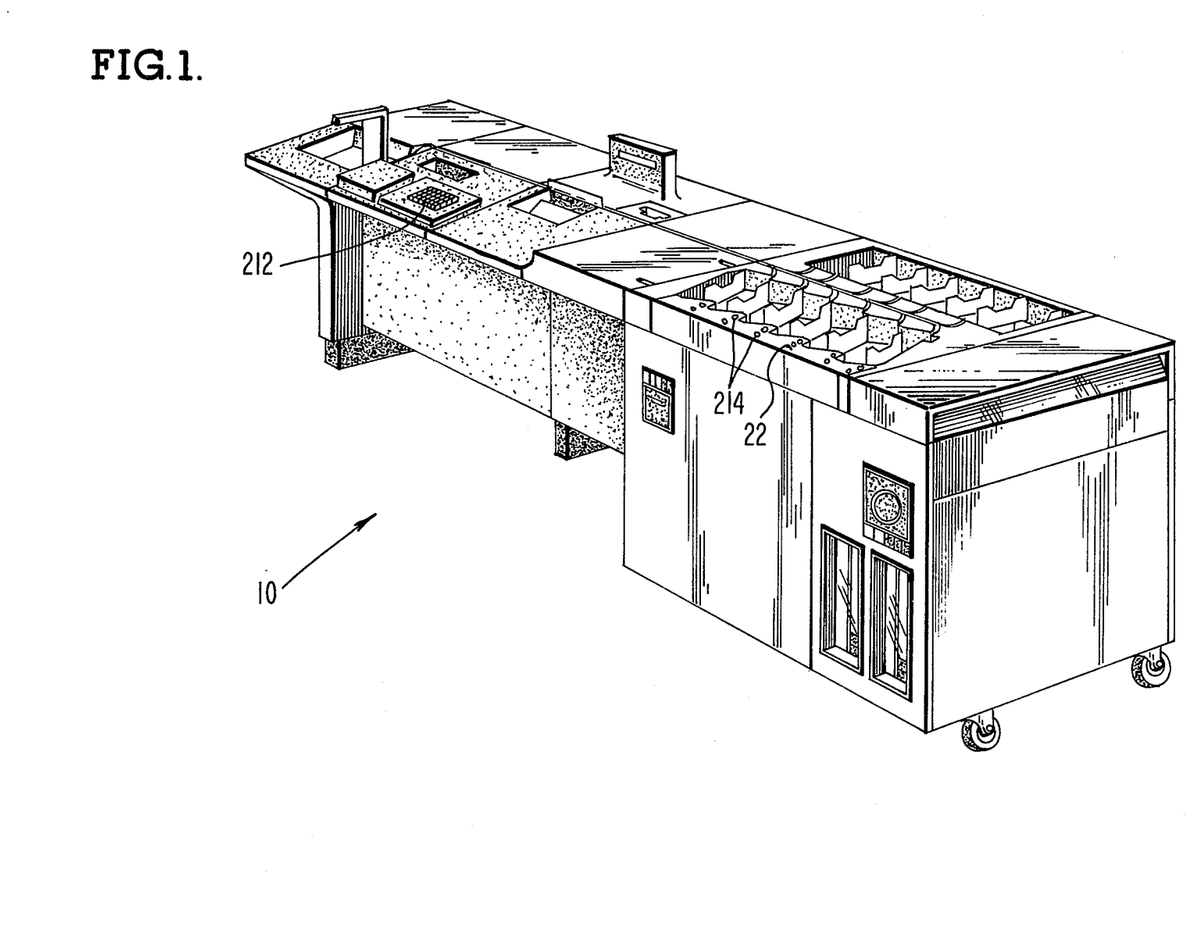
FIG. 1 is a perspective view of high speed front and back stacker reader/sorter apparatus embodying the present invention.
Figure 2:
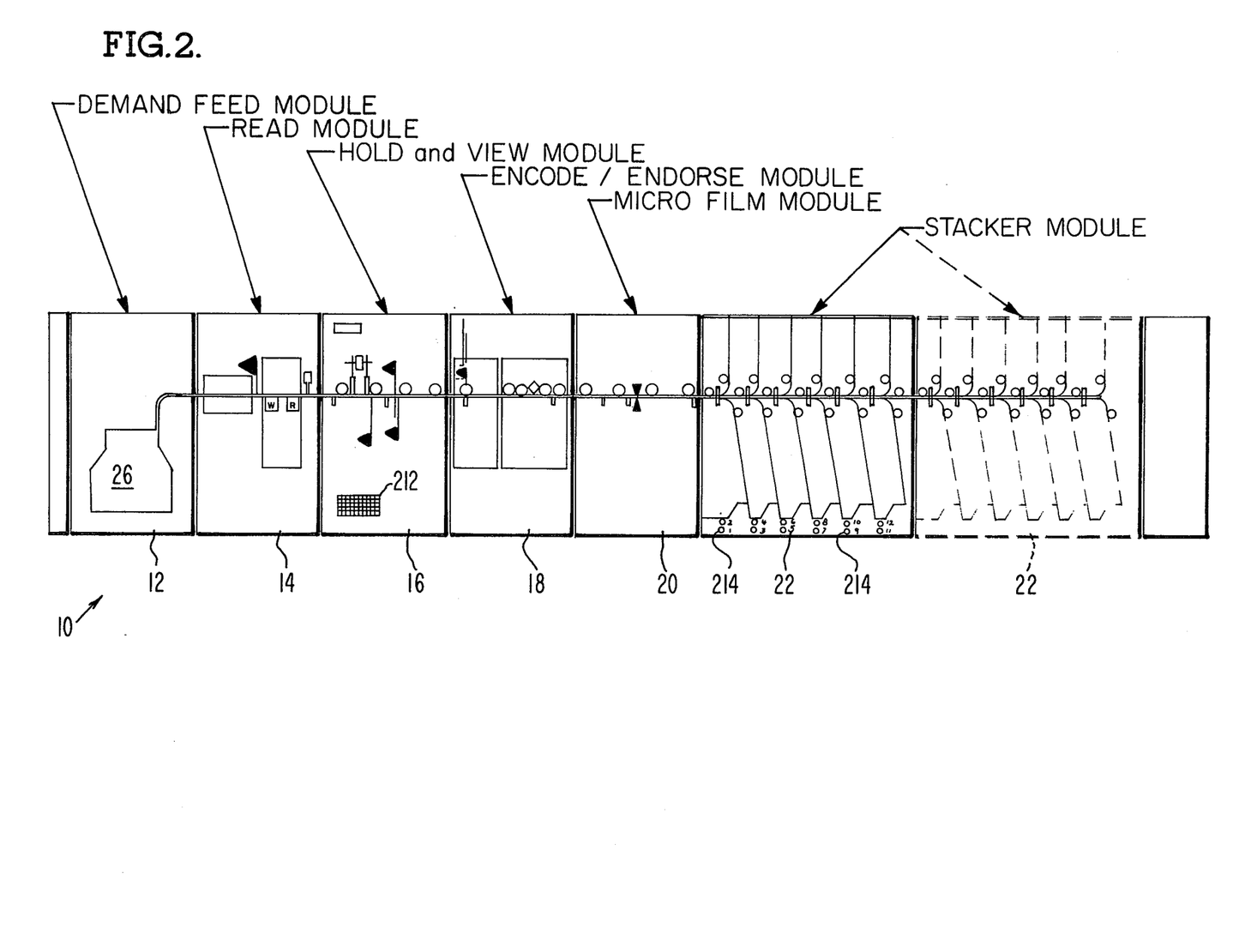
FIG. 2 is a top plan, schematic illustration, of the track configuration of the apparatus of FIG. 1.

As seen by reference to FIGS. 1 and 2 of the drawings, the present invention is embodied in a plurality of modular assemblies, which are coupled together in tandem fashion to form a complete reader/sorter apparatus.

A basic combination of modular assemblies forming a reader/sorter apparatus 10 may be seen by reference to the drawings to include the following items;
1. A demand/feed module 12
2. A read/write module 14
3. A hold and view module 16
4. An encode and endorser module 18
5. An optional micro/film module 20
6. A stacker module (minimum of two pockets or receptacles front and back) 22

Each of these modular assemblies 12 through 22 inclusive is completely self-contained and, in an operational environment, is interconnected to the other associated modular units both mechanically and electrically to provide a complete unitary reader/sorter/stacker assembly 10 providing either a straight through unobstructed item/document pathway or a selectable curvilinear pathway from the demand/feed module to one or all of the stacker receptacles or pockets.

Figure 4:
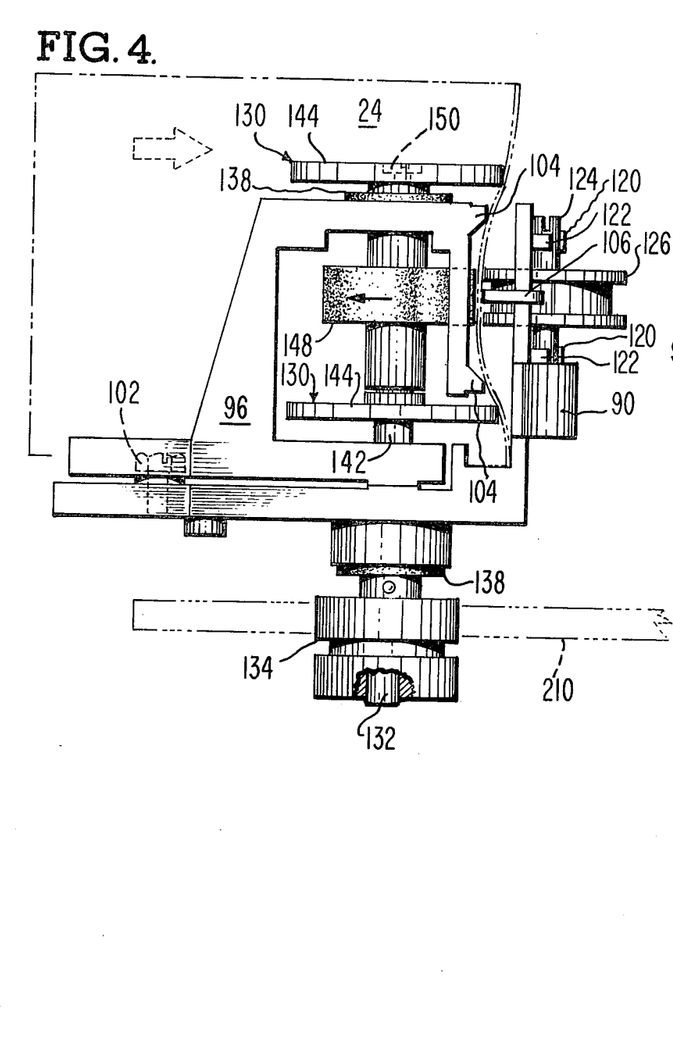
FIG. 4 is a right side elevational view of the apparatus of FIG. 3.
Figure 5:
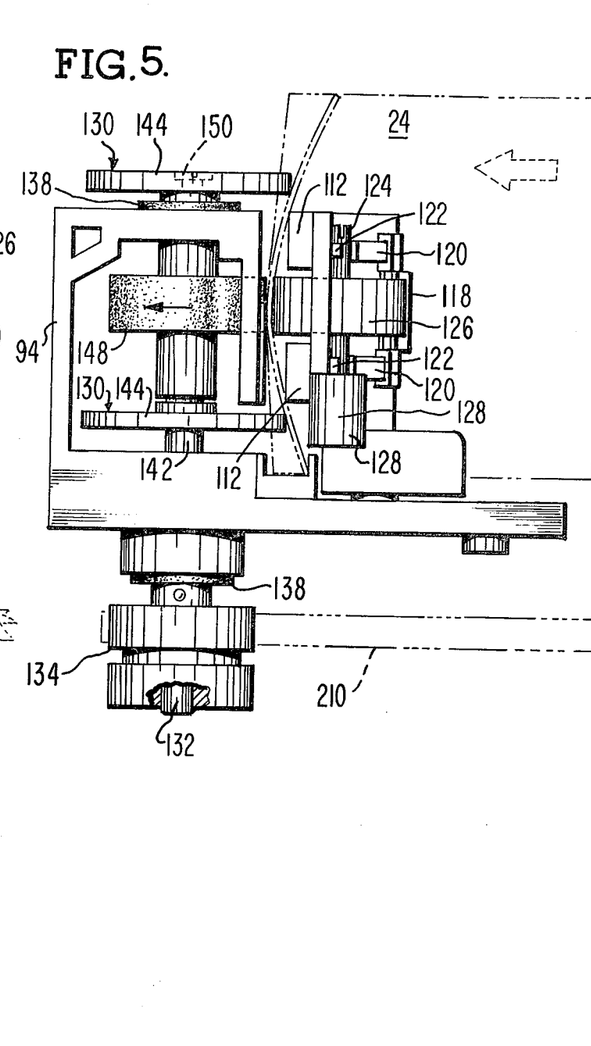
FIG. 5 is a left side elevational view of the apparatus of FIG. 3.

Item/documents e.g. bank check 24 FIGS. 4 & 5 are fed automatically at high speed (by means not shown) from the input hopper 26 of module 12 to the read module 14. At the read module 14 a pocket address is or may be determined assuming that the correct data can be read from the document. If, on the other hand, the document is incorrectly encoded it is passed to the hold and view module 16 where the attending operator can manually enter the correct data after which the document passes to the encode/endorse module 18 where the actual correction is entered on the document. If mircofilming is to be accomplished, the document is next passed to the microfilm module 20.

Figure 3:
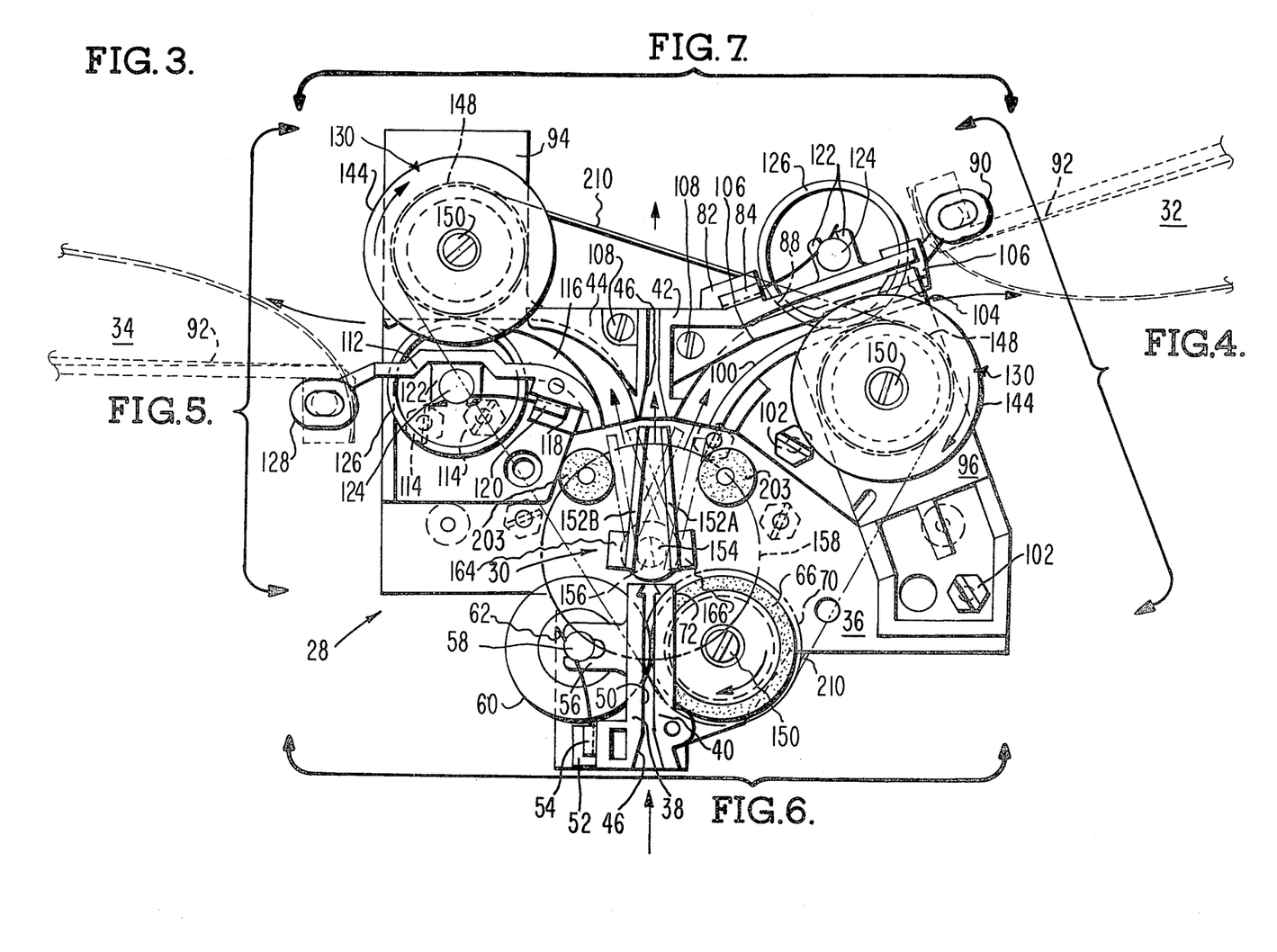
FIG. 3 is a top plan view of a demountable modular track selector assembly embodying features of the present invention.

As seen in FIG. 2, and with still more particularity in FIG. 3, apparatus embodying the present invention comprises a modular unitary subassembly 28 incorporating item/document track selector-diverter gate controller 30. Each gate controller-track selector 30 for each modular sub assembly 28 is capable of diverting the incoming items or documents 24 FIGS. 4 & 5 to either a front or a back stacker pocket receptacle 32 or 34 respectively, or forwarding those items downstream to the next pair of pocket receptacles. By mounting a plurality, e.g. six gate controllers in tandem (FIG. 2) a twelve stacker pocket module assembly may be provided. An additional six gate controller modules tandomly interconnected with the previous six gate controller modules can provide an additional twelve stacker pockets and so on for a maximum of 18 controllers for thirty six stacker pocket receptacles.

Each gate controller, selector, diverter module 30 is identical to its associated controller module so that a detailed description of one module and its operating mechanism as seen in FIG. 3, will suffice to explain the operation of all modules in any multi-stacker pocket assembly.

Basic to each track selector-gate controller module 30 is a compression molded base support member 36, FIG. 3. Integral with member 36 are (leading and trailing) right and left (as viewed in FIG. 3) upstanding item track wall forming members. (Right and left) Item entering or leading wall members 38 and 40 are disposed at the front (bottom as viewed in FIG. 3) of members 36 while (right and left) item trailing wall members 42 and 44 are disposed at the rear (top as viewed in FIG. 3) of member 36. The entering portion of each pair of wall members 38 and 40 and 42 and 44 is outwardly tapered as indicated at 46. The taper is effective to prevent flimsy items such as paper checks from "hanging up" or accidentially twisting out of the respective paths (arrows 48) due to the aerodynamic forces involved in moving such items at high speed along the item pathway 40.

Figure 6:
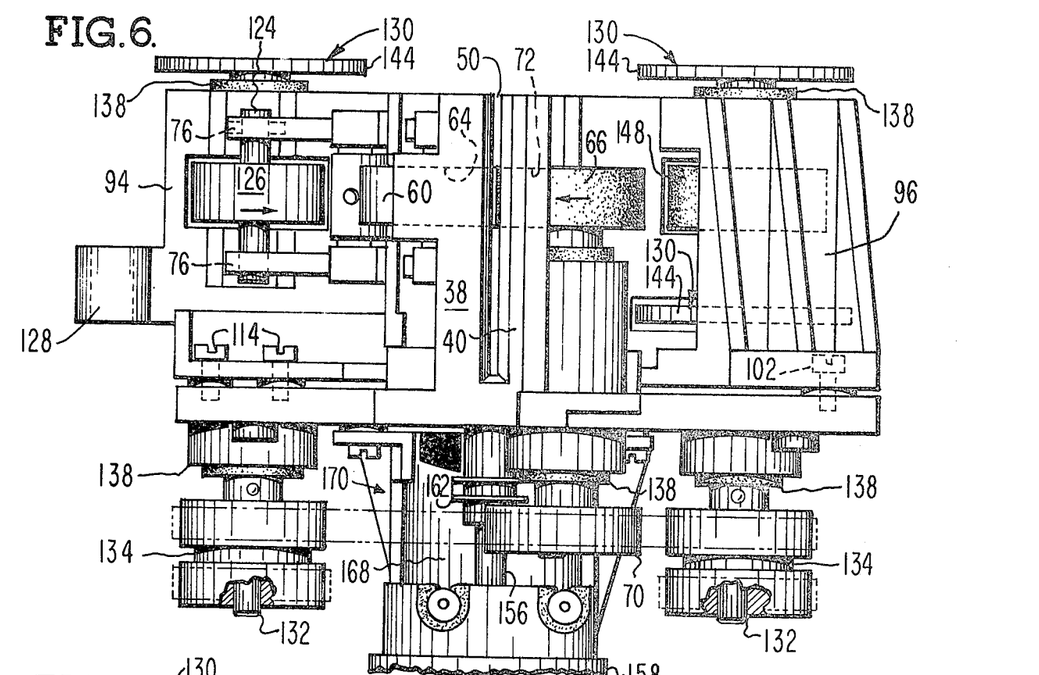
FIG. 6 is a front elevational view of the apparatus of FIG. 3.

Still with reference to FIG. 3 it is seen that integral with the left leading wall member 38 is an L-shaped bracket 52 which receives a U-shaped snap in spring retaining member 54, FIG. 6. Also, projecting outwardly away from left wall member 38 are oppositely disposed shaft receiving yoke members 56 for rotatably mounting shaft 58 of idler roller 60. The forwardly extending arm 62 of member 54 retains the ends of shaft 58 within yoke 56. The hard surfaced periphery of roller 60 projects through a rectangular opening 64, FIG. 6 in wall 38 into surface contact with resilient drum roller 66 rotatably mounted in integral mounting pedestal 68 of right wall member 40. Roller 66 is rotatably secured to the upper end of a vertical shaft (not shown) which carries at its opposite end a single faced drive pulley 70 for belt driving connection to the main drive means as will be identified and disclosed hereafter. Roller 66 projects through a rectangular opening 72 in wall 40 for surface driving contact with idler roller 60. Shaft 58 is suitably journaled in upper and lower bearings (not shown) press fitted into upper and lower resilient bearing recesses 74—74 recessed in mounting pedestal 68.

Projecting outwardly from the right trailing wall forming member 42 is a pair of integral open yokes 76 providing shaft mounting means for shaft 78 of idler roller 80.

An L-shaped mounting tang 82 integral with and projecting away from right wall member 42 provides means for snap-in mounting of resilient spring shaft retaining member 84. Idler roller 80 can thus be replaced at will as the need arises by the simple expedient of snapping out the U-shaped spring shaft retainer 84 releasing idler shaft 86 and snapping in the replacement roller unit. Roller 80 projects into and through a rectangular opening 88 in wall 42.

The outer surface of right trailing wall forming member 42 includes an outboard mounting tang 90 for snap in mounting of item deflector apparatus 92 as described and claimed in co-pending U.S. application 959,909 filed Nov. 13, 1978 in the name of William B. Templeton entitled Guide Arm Assembly, assigned to the same assignee as this application.

Integral with the rear portion of left trailing side wall member 44 is an upstanding rearwardly projecting shaft mounting pedestal 94 for purposes which will become clear as this description proceeds.

In order to rigidify the somewhat flimsy paper checks which are included in the average daily batch of items to be sorted each item is longitudinally bowed or columnated lengthwise stiffening the item and assuring proper handling as the item is forwarded through the sorter 10.

Forming the inner (righthand) confronting complementary wall member to outer wall member 42, FIGS. 3 and 4, is a molded upstanding rectangular, mounting pedestal member 96, the forward confronting face (relative to wall member 42) is arcuately curved as at 100 so as to direct items forwarded therealong rightwardly into pocket 32. Bolts 102 secure member 96 to base support member 36. The rightward forward edge FIG. 4 of 96 is provided with upper and lower outwardly extending wedge shaped projections 104 which, together with curvalinear member 106, secured by bolt 108 to the rearward face of right trailing wall member 42 as seen in FIG. 4, aid in causing items 24 to partake of an inwardly bowed condition as the item passes therebetween as will become more clear hereinafter. A rectangular opening 110 for purposes still to be described is provided in member 96.

The left inner confronting wall member 112, complimentary outer wall forming member 44 is a molded L-shaped member attached to base 36 by bolts 114. The confronting portion (facing wall member 44) is irregularly shaped and provided with a central arcuately shaped member 116, FIG. 3 integral with member 112 extending into the path of the entering items 24. The rearwardly facing surface of wall member 112 is provided with an integral L-shaped projection 118 for snap in mounting a U-shaped spring shaft retainer 120 and upper and lower yoke members 122 for mounting shaft 124 of idler roller 126 thereto. The left most extremity of wall member 112 terminates in a oblong losenge shaped tang 128 for snap in mounting of an item deflecting apparatus 92, as hereinbefore described.

Figure 7:
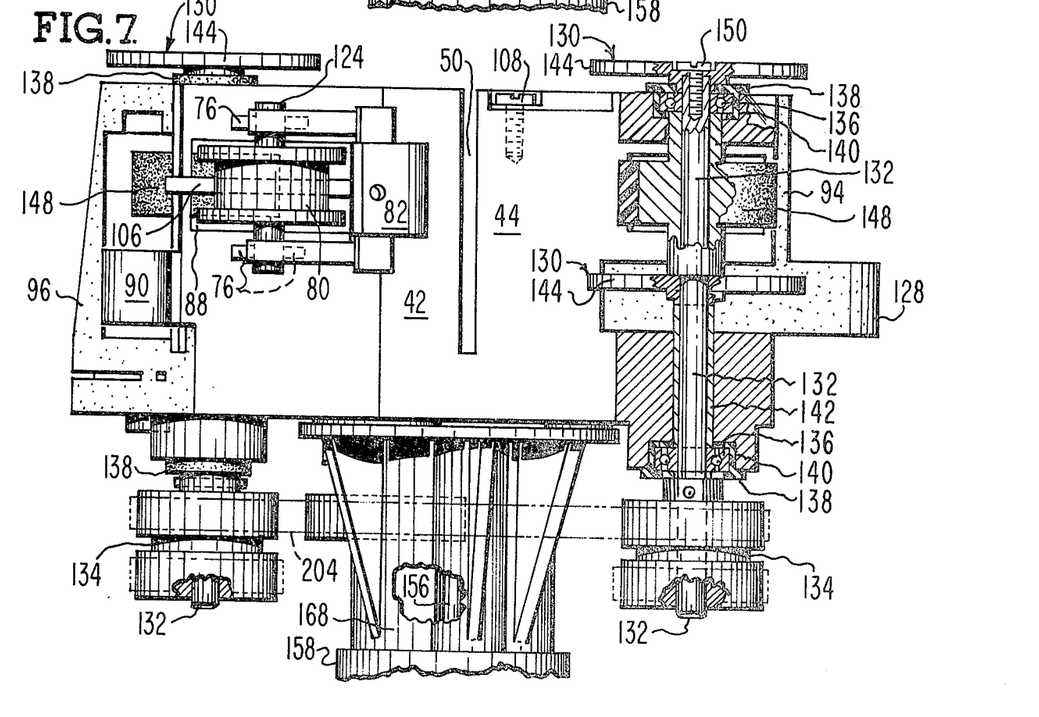
FIG. 7 is a rear elevational view of the apparatus of FIG. 3.

As an aid in fabrication and assembly, and so as to reduce the overall number of associated pieces of hardware, each columnating roller assembly 130, of which there are two for each item diverter track selector gate module 30, is seen in FIGS. 3, 4, 5, 6, & 9 to include a central shaft member 132, FIG. 7 to the bottom end of which is pinned a dual surface pulley wheel 134. Upper and lower bearing members 136 are each received in press fitted relationship within a flexible Neoprene cam bearing holder 138 the latter being press fitted into upper and lower recesses 140, FIG. 7 in respective left and right pedestal shaft supports 94 and 96. An elongated separator or collar like member 142, FIG. 8B supports the lower of two columnating rollers 144 on shaft 132. A rubber tired drive roller 148 is mounted on shaft 132 intermediate the upper and lower columnating rollers 144. The upper end of each shaft 132 projects into and through the upper bearing member 136 disposed in its flexible Neoprene bearing holder 138, and is secured within each support by means of a short bolt 150. The foregoing construction provides for simple, fast and efficient mounting and dismounting which requires only a modest degree of finger dexterity and relatively little mechanical skill.

As seen most clearly in FIGS. 4 and 5, this constructing provides a positive bowing of each item as it passes between the pairs of upper and lower columnating rollers and the intermediate drum roller. Thus each item is automatically rigidified throughout its length during its passage through the track to the selected pocket.

As individual items are forwarded downstream from the read/write, hold and view and microfilm modules, item pocket selection and identification, by means still to be described, is performed on each item after which the item is passed either on to the next pocket selector module or is diverted to the right or to the left of the central track by the initial pocket selection routine.

Means for automatically diverting each item into the preselected pocket or receptacle is seen in FIGS. 3, 8, 8A, 9 & 10 to include a rectangular gate like structure 152 formed by two confronting, substantially identical, rigid, rectangular, plastic members 152A and 152B integral with or secured to a pedestal mounting member or hub 154, for attachment to the vertically disposed shaft 156 of stepper motor 158 by means of the slot 160 and clamp 162. The forward ends (rightward in FIG. 8) of members 152A and 152B are inwardly angled so that the gap or pathway formed between these members is relatively wide at the entering end (leftward in FIG. 8) and is narrowed at the exiting end (rightward in FIG. 8) for purposes to be explained later on herein. The plastic material "Polysulfoam" from which the diverter gate assembly 152 is fabricated is such that when sufficiently thin in cross section e.g. 0.0020 inches it becomes transparent to light. This feature is utilized to advantage in the present invention by placing a phototransistor 164 and an LED (light emitting diode) assembly 166 in the entering portion of respective upstanding members 152A and 152B with the LED on one side and the phototransistor on the other side of the construction so that the light output of the LED is caused to cross the gap between members. This construction eliminates the need for apertures, receptacles or openings of any kind in the diverter gate 152 for the phototransistor and LED's thus avoiding the problems of items hanging up within the diverter gate. It also avoids the problems of dirt which cannot collect on the smooth surface of the inside walls of members 152A and 152B which could cause a reduction in light output and thus a missort.

Stepper motor 158 is suspended beneath the base or support member 36 by means of a half cylindrical member 168, the lower portion of which is bolted to the upper end of motor 158 with the upper half circular portion of member 168 being bolted to the bottom of the support 36. The open area 170 in half cylindrical member 168 provides clearance for operably associated portions of the item transport within the module 30. The upper end of shaft 156 projects through an access opening (not shown) in base 36 and is secured to the pedestal mounting member 154 for arcuate rotative movement, as will be described later on herein.

Figures 9, 10, 11:
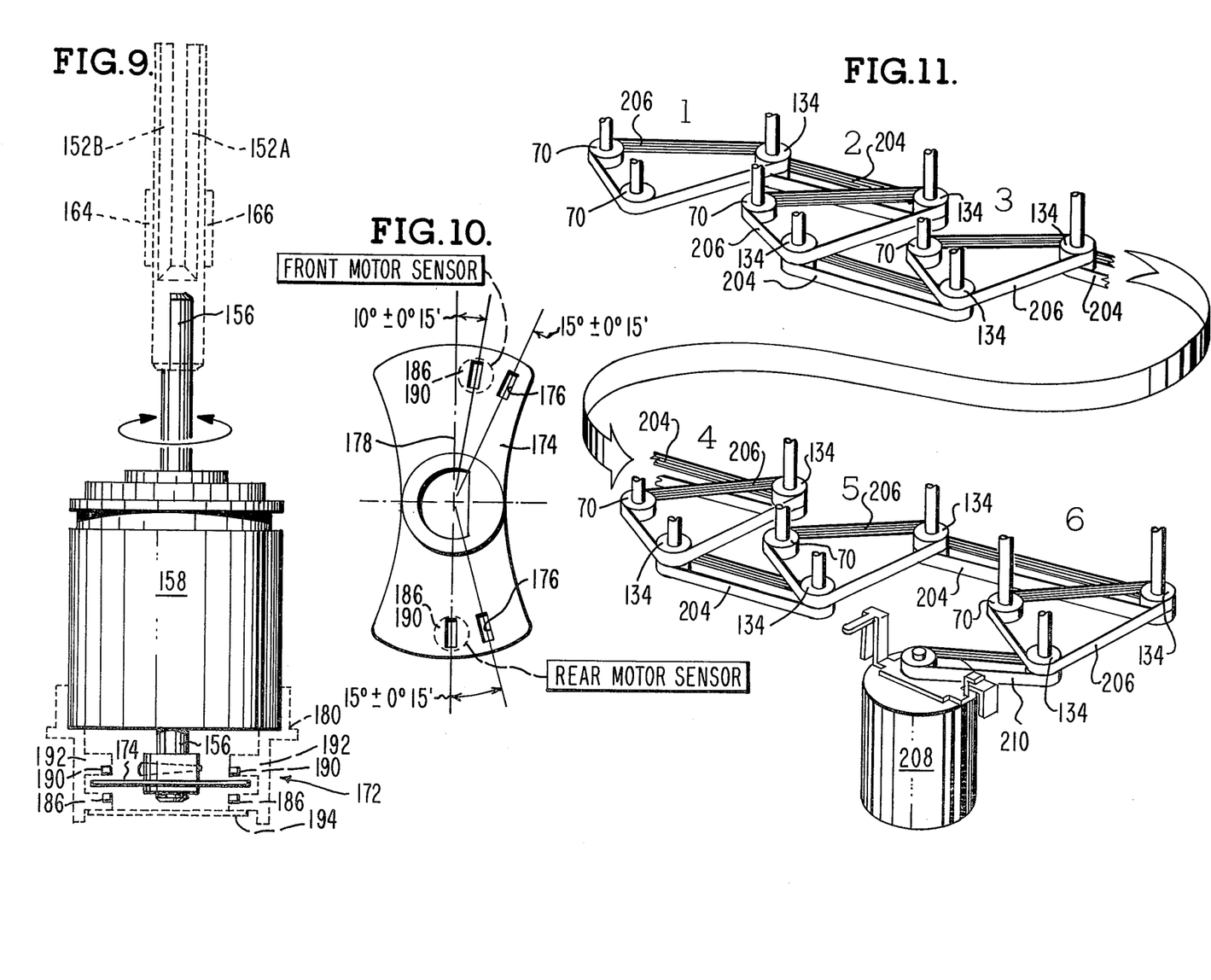
FIG. 9 is a front elevational view of the stepper motor drive means for the diverter gate control including the indicating mechanism therefor.
FIG. 10 is an enlarged detail view of the gate motor control indicating rotor-sensor of the present invention.
FIG. 11 is an isometric view (not to scale) of the main drive belt configuration for the tandomly associated gate control module assemblies.

Since the sorter pockets are disposed on opposite sides of the central item sorting pathway it is necessary for the apparatus to be able to determine or indicate precisely where the diverter gate 152 is located at any particular instant so as to avoid missorts, jams and other similar problems. An indicating device 172 is seen in FIGS. 9 and 10 to comprise a flat, fan shaped member 174 secured to the opposite end of motor shaft 156. Opposite sides of blade 174 are each provided with pairs of parallel elongated perforations or slots 176 as seen in detail in FIG. 10. The slots are each 0.125 inches long by 0.048 inches wide with the blade being 0.0100 inches thick and 1.50 inches in length. The slots of each pair are spaced apart by 15 degrees. The left slot of the upper pair of slots FIG. 10 is offset from the centerline 178 by 10 degrees, as shown, while the lower pair of slots has one of the pair on alignment with the centerline 178. The offset noted hereinabove among other things acts as an aid in assembly so that the fan blade 174 cannot be mismounted relative to the two LED-phototransistor assemblies now to be described.

Figures 8, 8A, 8B:
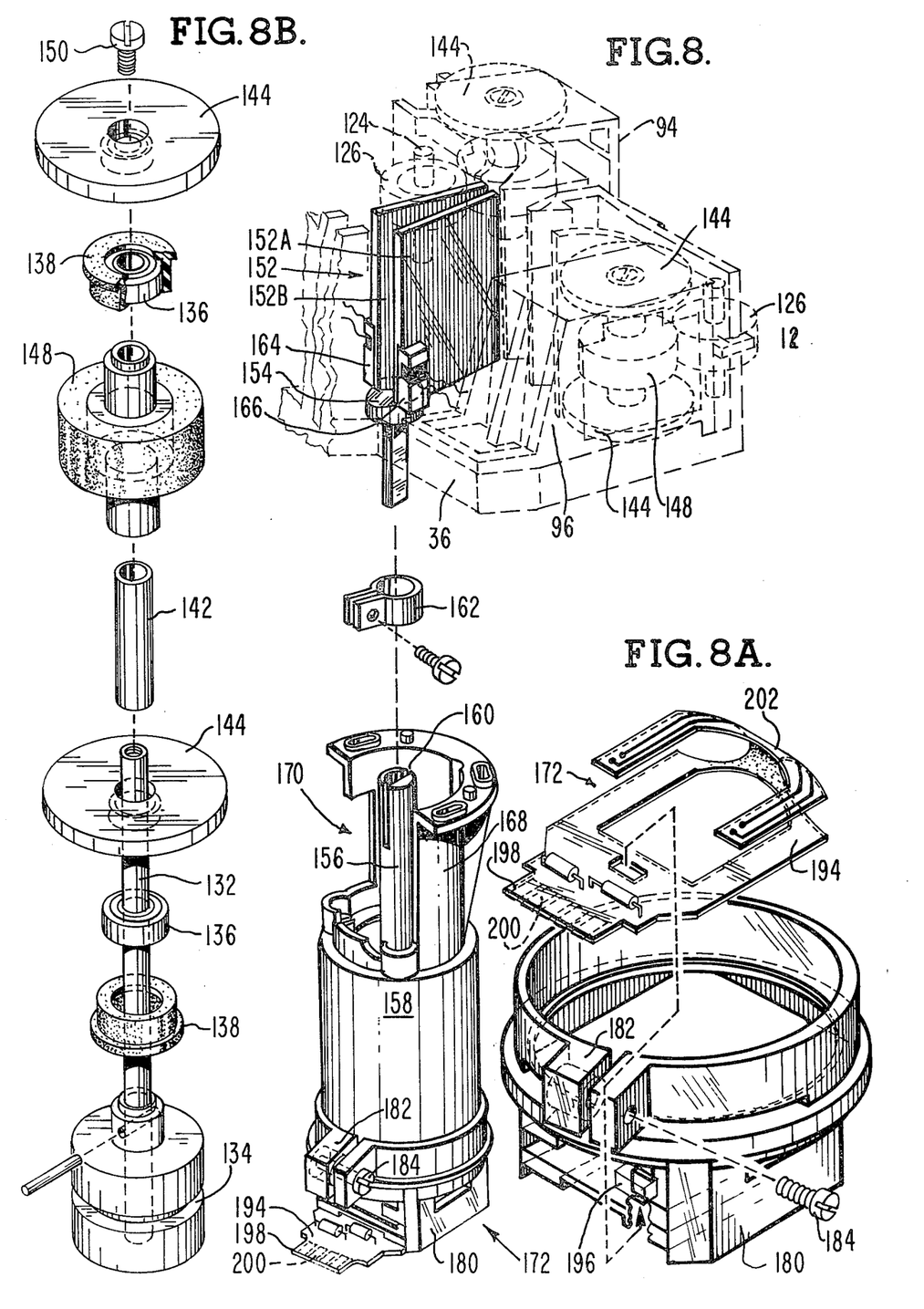
FIG. 8 is an exploded isometric view of the modular item diverter gate controller and sensor assembly for the apparatus of FIG. 1.
FIG. 8A is an isometric view of the indicating mechanism for the diverter gate control.
FIG. 8B is an exploded isometric view of the demountable columnating-drive roller assembly.

For use in assembly, service and replacement the electrical portion of the indicating mechanism 172 is housed in a demountable unitary plastic mounting assembly 180 as shown in the lower portion of FIGS. 8 and 9 and in FIG. 8A.

The rigid plastic mounting member 180 is adapted to encircle the base of motor 158 to which it is secured by means of an integral clamp 182 and bolt 184.

An emitter in the form of a light emitting diode (LED) 186 is disposed on each opposite lower shelf-like member 188. A complimentary receptor in the form of a phototransistor 190 is disposed on each opposite corresponding upper shelf-like member 192 with fan blade rotor 174 arranged to move arcuately therebetween, as clearly shown in FIG. 9. A printed wiring pad or panel 194 snap fitted over projecting tang 196 on member 172 and provided with a tongue 178 having electrical circuit contacts 200 thereon for pluggable connection to associated electrical circuitry (not shown) is coupled to both sets of LED-phototransistor assemblies 186–190 by means of a flexible wiring harness 202.

Figure 14:
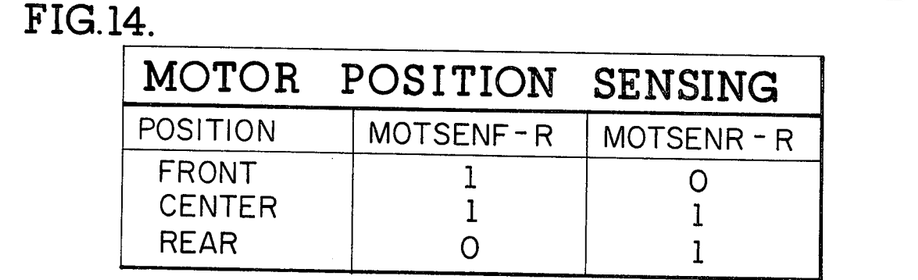
FIG. 14 is a chart illustrating the binary motor position and sensing arrangement utilized in the present invention.

Referring to FIGS. 10 and 14 and assuming the vane 174 is located so as to indicate that the diverter gate 152 is in the center position, as shown, then the two slots, one on the centerline and the other 10 degrees offset from the centerline uncover the two optic receptors or sensors 186–190 (binary position 1—1 FIG. 14). Fifteen degrees to the right of the 10 degree offset slot is another slot 176 which when the shaft 156 is positioned so that the slot uncovers the receptor will indicate that the "front" pocket is available (binary position 1-0 FIG. 14). Thirty degrees from this position places the lower right hand slot 176 over the photoreceptor indicating that the rear pocket is available for sorting. (binary position 0-1 FIG. 14) Right and left resilient snubbers or bumpers 203, FIG. 3 on base 36 act to absorb any shock or bounce developed as the member 152 swings a full 30 degrees from right to left during a pocket selection operation.

In order to limit the number of basic driving components the input rotative torque is applied to the tandomly associated modules 30 by means of interconnected drive belts certain of which are utilized to drive documents through each module and others of which are employed to interconnect the drive elements of each module with the next adjacent module and ultimately to connect the last module with a single drive motor.

As seen in FIGS. 3, 6, 7 & 11 (particularly in FIG. 11), the triangular arrangement of pulley wheels of the tandomly arranged modules permits the left double faced pulley wheel 134, FIGS. 3 & 6 of the first module to be used to interconnect by means of a drive belt 204 this module with its next adjacent neighboring module as shown. The three pulley wheels (two double faced 134 and one single faced pulley 70) of each module are themselves driven by a single flexible drive belt 206. Electric motor 208 energized from a source of electrical potential (not shown) drives the last downstream module of each group of six modules through drive belt 210. Each module in turn is back connected by endless belts to the first module in the line of modules. In this way, the tandomly associated sorting modules are enabled to be driven very efficiently and reliably by means of a single drive motor.

Stacker Pocket Receptacle Selection

The stacker pocket receptacles of the subject apparatus embodying the present invention may include as many as 36 pocket receptacles or as few as two pockets in multiples of two. For example, four, eight, twelve, eighteen, twenty-four, thirty, and thirty-six, depending on the specific combination as required by a specific size and variety of sorting problems.

The specific control circuitry for the subject invention forms the basis of copending U.S. patent application Ser. No. 54,290 filed July 2, 1979 in the name of Andrew H. McMillan entitled *A Self Configuring Controller for the Stacker Area of a Document Sorting System* and U.S. Patent Application Ser. No. 33,963 filed Apr. 27, 1979, in the name of Andrew H. McMillan entitled "Multiplexed Incremental Motion Controller", both of which are assigned to the same assignee as the present invention. Only so much of the control aspects of the apparatus will be described herein as is believed to be germane to the subject operative description. For a complete description reference may be had to this aforementioned copending application.

FIGS. 12 through 16A and 16B inclusive are schematic diagrams (FIGS. 12, 16A and 16B together form a timing diagram) which illustrates both track configuration as well as organization of interrelated portions of the apparatus with reference to the sequence of operation or steps of the major elements of the present invention as embodied in a high speed reader/sorter apparatus.

The term sensor, sensor assembly, sensor module or indicating device is used in differing contexts throughout the following description. All sensors (indicating devices) as herein described are substantially identical, only the physical location may vary which of course may necessitate some difference in structural configuration or environment. However, each sensor comprises a source of light i.e. an LED (light emitting diode) and a light receptor i.e. a phototransistor. These two elements are employed in an interruptive mode i.e. the LED light is broken or interrupted by some activity such as the passage of a document or item therepast which breaks or cuts off the light beam and signals some function, step or action to be taken by some other associated portion of the apparatus combination.

In the following description (with reference to FIGS. 15A and 15B) it is assumed that a sensor assembly (as before described) is positioned upstream i.e. ahead of each pocket selector diverter gate module 30 with the LED in one confronting wall of the item transport pathway or track and the phototransistor in the opposite confronting wall of the item track or, as in FIGS. 3, 8, and 9 in the confronting walls of the item diverter gate 152. Thus, passage of an item along the track therebetween will interrupt the light beam and signal the activity of the item as it passes the sensor. Also, since each diverter gate module controls two oppositely disposed pockets (one front and one rear as viewed from above) a total of 18 gate controls can effectively control the operation of 36 pockets or receptacles. Furthermore, since each gate control module is identical with every other gate control module, description of the operation of one module will suffice for all 18 modules.

Initially, the documents or items 24 are read at read station 14. Information including the transit code, the amount, the account number, etc., is picked up by the reader transducer (not shown) and forwarded to a processor (not shown) in the base apparatus. Electrically this results in the assignment of a pocket or receptacle address in the form of a six bit address code for each item/document. This address code is utilized to designate one of the 36 pockets in the apparatus, assuming that the apparatus has that total. Conversely, the six bit address code may be indexed manually into the machine by means of a keyboard entry mechanism 212 (at the hold and view station 16) as when, for example, the data on the document is determined to be incorrect. Thus, the pocket address can be entirely under software control as determined by the information derived from the item reader or it may result from operator intervention. Once the address is received in the program of the machine regardless of whether there is operator intervention or not the program assigns the pocket address code designation or number. The address is then sent to the encoder section 18 of the apparatus. The encoder 18 examines the address and assigns the pocket address to the specific document. It should be noted that the address itself exists only in the pocket address registers (not shown) of the machine. It does not appear anywhere on the face of the document. The program will assign the specific relevance to each pocket and the criteria by which the machine apparatus decides which documents 24 go to which pocket receptacles.

Figure 12:
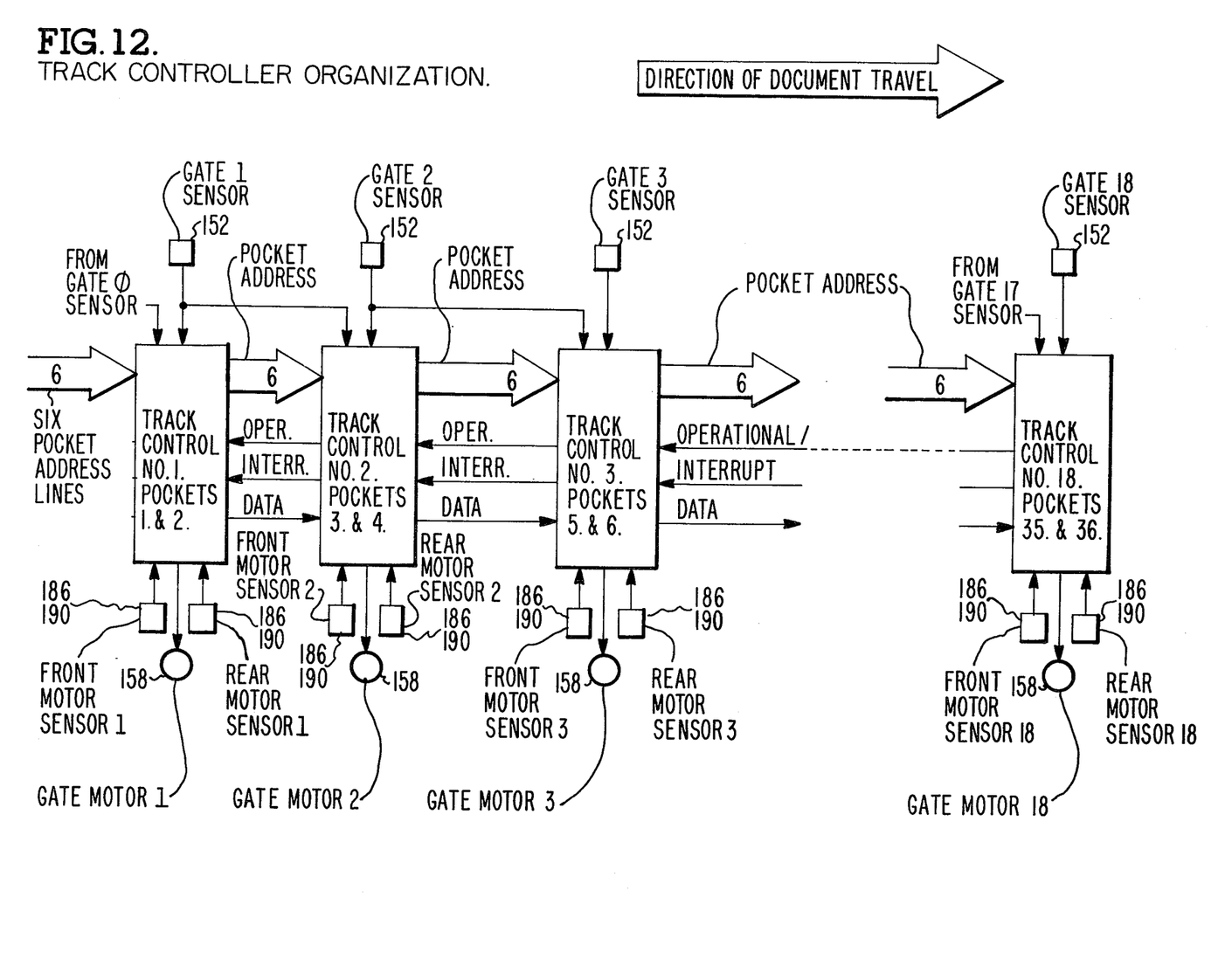
FIG. 12 is a schematic diagram of the track controller configuration of the apparatus of FIG. 1.
Figure 13:
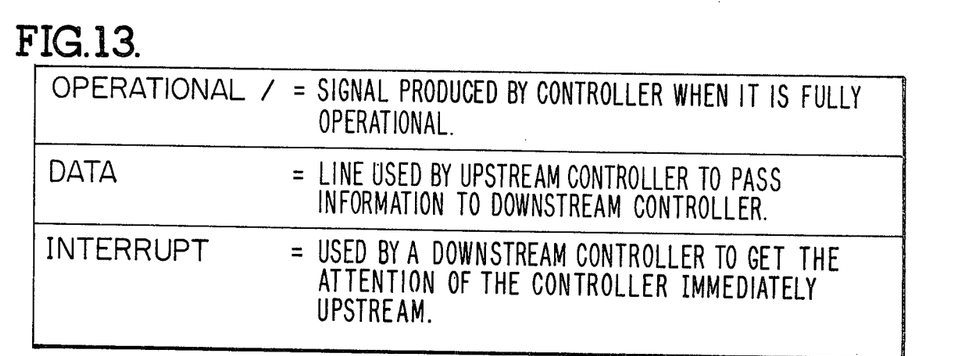
FIG. 13 is a chart defining certain interconnect lines employed in the diagram of FIG. 12.
Figure 15A:
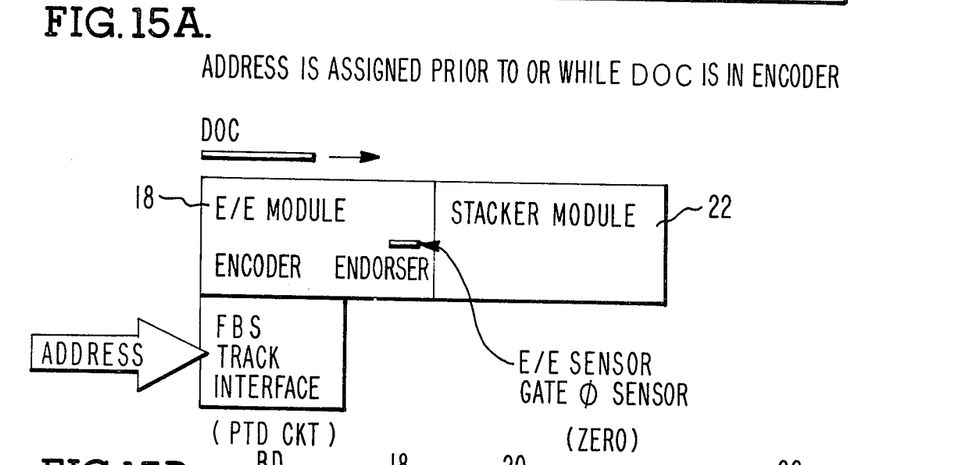
FIGS. 15A and 15B are charts illustrating two optional variations in track configuration embodying the present invention.

In the apparatus format which does not include a microfilm module 20 FIG. 15A the endorse and encode sensor (LED-phototransistor assembly) is referred to for the sake of the present description as the "gate zero 0 sensor". This sensor is located upstream from the first receptacle gate diverter module 30 at the trailing or rightward end of the E/E module). With the address assigned to the document 24 at the encoder 18 the document proceeds along the track by means of a drive mechanism (not shown). As indicated in FIG. 12 the address is transfered downstream from controller to controller. Note on the diagram that the six bits of pocket address information which comes from a "front-back stacker track interface printed circuit card" (not shown) which is a portion of the hardwired logic of the base machine, is serially transferred from controller to controller along the lines marked or identified as "pocket address" with the numeral 6 thereunder. The registers (not shown) in the hardware of the machine effect the transfer of this information from one controller to the next. Effectively, each gate controller is supplied with the address information in advance of the receipt by that module of the particular document.

Figure 15B:
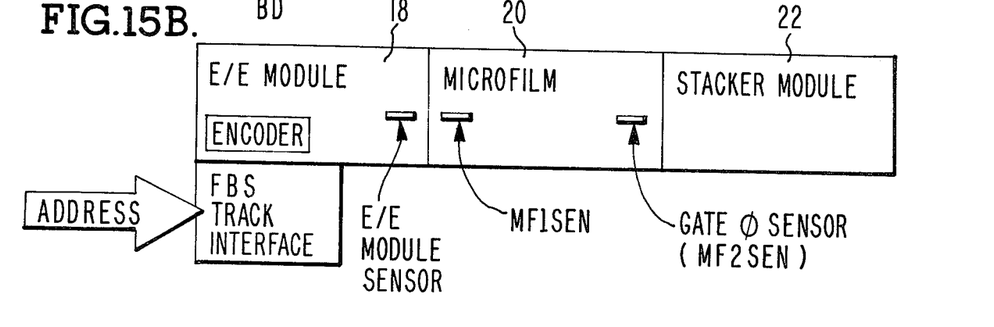

In the optional apparatus configuration that includes a microfilm unit 20, FIG. 15B the "gate zero 0 sensor", is located immediately upstream from the adjacent stacker module 22. However, in this instance it is designated "microfilm sensor MF1." A microfilm sensor MF2 is located downstream from MF1 and is identical thereto. The "track interface printed circuit board" that receives the pocket address from the processor of the machine once again assigns the pocket designated descriptive code to the document for the particular pocket and the item is routed downstream. Once the document arrives at the MF2 sensor, in the case in which the microfilm unit 20 is utilized, the operation becomes the same as for the stacker module without the microfilm option. The behavior of the track controller gate diverter is essentially the same regardless of whether it is looking at the "E & E sensor" FIG. 15A or the "MF2 sensor." The address is simply passed along the track as the document progresses from sensor to sensor until it comes to the last sensor in the track prior to the stacker module. Then the stacker modules take over control of the document as will now be described.

Figure 16A:
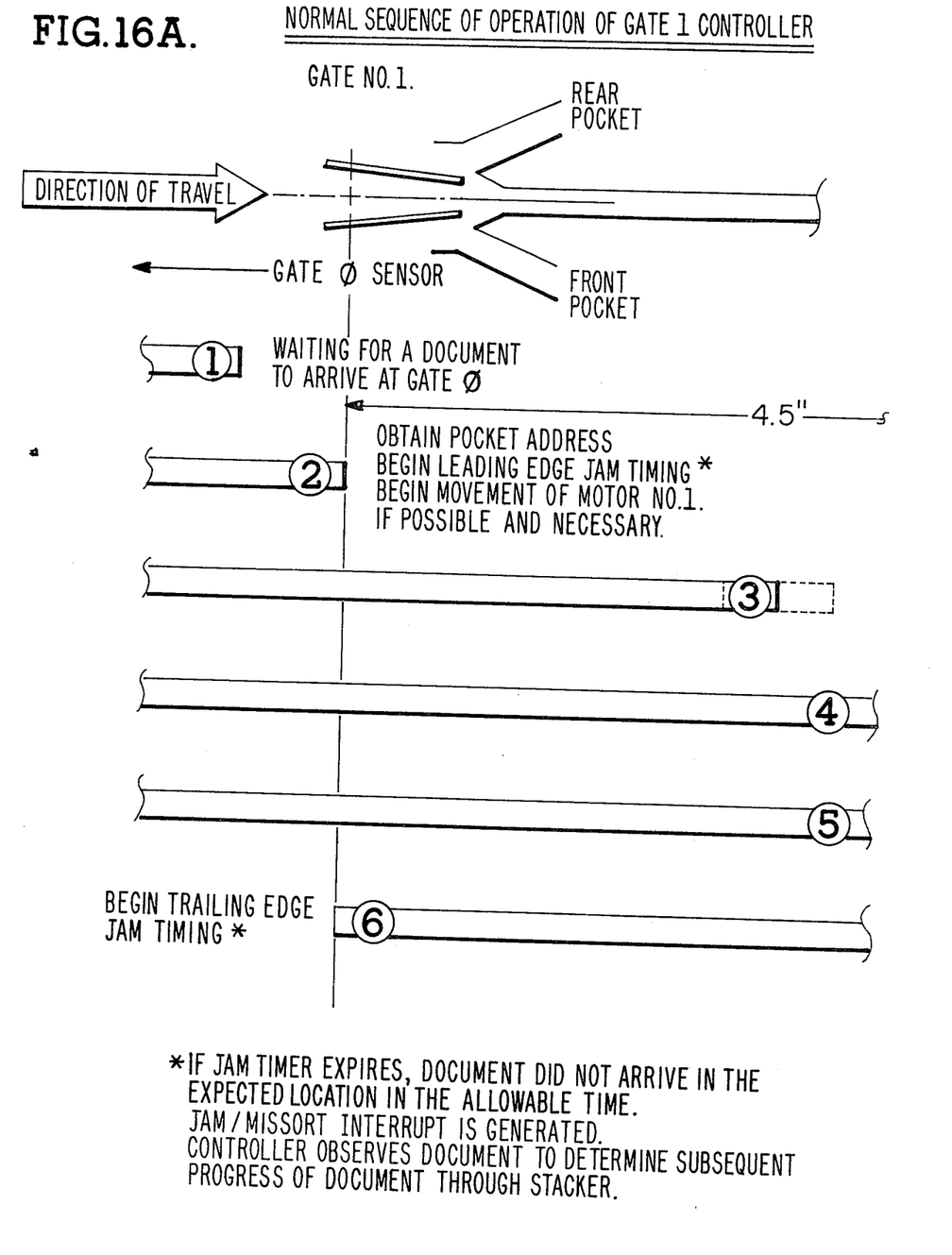
FIGS. 16A and 16B together form a timing diagram illustrating the operation of the track sensing and control mechanisms embodying the present invention.
Figure 16B:
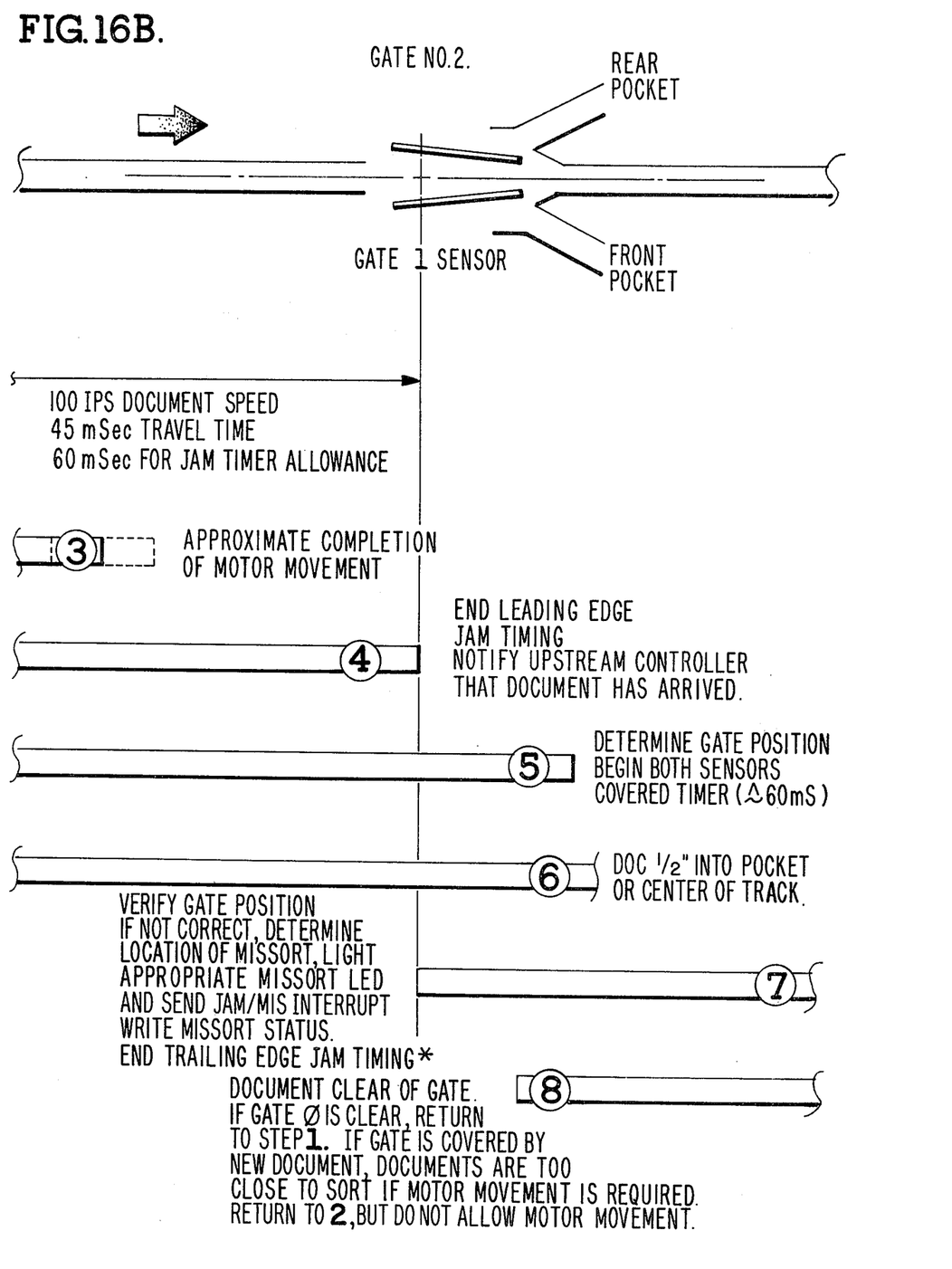

Reference is now had to FIGS. 16A and 16B (timing diagram) which illustrates in timed sequence the operation of a typical gate controller.

At time ① the apparatus is in a so called idle mode the first stacker module 22 has received an address signal and is waiting for the item 24 that is coming into the first gate controller/diverter 30. At this point gate diverter 30 has not been informed of the actual pocket destination i.e. whether it is a front or back stacker pocket. It is noted that the stacker pocket diverter control module has a so called "home position" for locating the diverter gate when the apparatus is first "powered up". This is the clear track or center position FIGS. 3 and 10. However, when the machine is in use and after a so called self confidence test routine has been run and the gate has been placed in all three of its positions and the sensors have been checked to make sure the sensors correspond with the three positions, the gate will remain in whatever position it was in as of the last item that was sorted.

As before noted the six bit address is gated from the gate zero sensor to the first controller, which controls the front and back pockets of receptacles one and two. When the document arrives at the upstream sensor and receives the pocket address this is handled entirely in hardware. The controller examines the address, determines whether the document now at time ① is supposed to proceed down to the particular gate and then decides whether the front or the rear pocket of the first controller is to receive the document. If the processor determines that the document is to go to controller gate number one a "leading edge jam timer" is initiated at time ②. This times the documents between the two gate sensors. Since there is a four and one half inch separation between gate sensors No. 1 and No. 2 and the document speed is approximately one hundred inches per second there is a mean time of approximately forty five milliseconds of travel between the two gates. Additional tolerance is added to bring the "leading edge jam timer" time to sixty milliseconds. If the document arrives within sixty milliseconds it is assumed that the machine is operating correctly. However, if the document does not arrive within sixty milliseconds then the main processor of the machine is alerted that a jam has occurred. Processing is continued and the machine waits for the document to start moving again. Occasionally it is a temporary slow down or sometimes the document track is obstructed delaying the item temporarily after which it starts moving again. When the document arrives at controller No. 1 a decision is made as to whether it is necessary to activate the stepper motor to move the No. 1 gate. If the No. 1 gate is already in the proper position, it remains where it is. If it is not in the proper position then at that time gate No. 1 e.g. member 152, FIG. 3 is moved to the proper position FIGS. 3 and 10 either taking a single step moving fifteen degrees or taking a double step of thirty degrees to get the gate into the correct location. It takes approximately twenty milliseconds to move the gate. Thus, as indicated at time ③ on the timing diagram, the leading edge of the item is going to be somewhere between gate controller No. 1 and No. 2 when the gate No. 1 motor movement is finally complete. When the document finally arrives at the sensor of controller No. 1 indicated at time ④ on the timing diagram, the "leading edge jam timer" is shut off. If the document arrived in the proper time, the upstream controller sensor is notified that it has detected a document. The document has now moved into the gate control module No. 1 and at approximately 0.5 in position time ④ on the timing diagram the document has proceeded into either the front or rear pocket or into the center section of the track depending on the track selection.

Stepper motor sensor for gate No. 1 is observed to determine the position of the No. 1 gate control module i.e. whether it is in the position it was commanded to go to. These devices as before mentioned are located at the lower end of the stepper motor of each gate controller FIGS. 8 and 9. In accordance with the binary code of FIG. 14 the three positions the motor and gate happens to be in at the moment are indicated. This information is stored for processing later on but at this time ⑤ on the timing diagram "both sensors covered jam timer" is started. This is also a sixty millisecond timer. As the timing diagram illustrates the document is now covering gate zero sensor and covering gate No. 1 sensor at the same time. The reason for this is that the two gates are located four and a half inches apart but the minimum size document the machine is adapted to operate with is four and seven eighths inches." Since the distance between the gate zero sensor and gate No. 1 is shorter than the minimum size document there is a point in time where both sensors are covered. The "both sensors covered timer" is started at this position time ⑤ to make sure that the two sensors do not stay covered for too long a period. For example, it would be possible for a document to stop so that it would cover both sensors and without this timer running no indication would be provided for this malfunction.

At this point if sixty milliseconds elapses before the document reaches the position time ⑥ then the main processor is notified that there is something wrong in the track or the document is not moving the way it is supposed to; a jam/missort-interrupt signal is generated. If, however, the document reaches position time ⑥ within the sixty milliseconds then the document is processed normally. Assuming that the document is at position time ⑥, FIG. 16B, and that the upstream No. 1 sensor is uncovered, an "end trailing edge jam timer" is started time ⑦. This timer allows sixty milliseconds for the "trailing edge" of the document to go from the gate zero sensor to the gate one sensor. This is similar to the timing of sixty milliseconds for the "leading edge" of the document to go from gate zero to gate one. The gate motor is already in the desired position. If the trailing edge of the document arrives within the sixty millisecond time frame the last jam timer is shut off. This timing is verified to make sure the document went to the precise location. At the time the document leaves the sensor at position time ⑦ a calculation is made to determine if the document has entered the right pocket. If the sensors have indicated the document was supposed to go to the front, when it in fact went to the back or that something was dropped into the track and forced the gate to the wrong position or the motor failed and did not move when it was supposed to, the position of the motor will be determined and if it was a missort then the missort light 214 associated with the pocket will be lighted. If However, the document is clear of Gate No. 1 and with sensor No. 0 Position time ⑧ clear, the apparatus is ready for the next item to be sorted.

The disclosed combination of front and back stacking means reduced the transport stacking mechanism by approximately sixty six percent. The number of individual gates is half that required with the straight line throughput and utilizing a six hundred document per minute system only half as many sensing devices are required as would be the case with a straight line system. The floor area is reduced by approximately 9.4 square feet and the system length is reduced by approximately 3.5 feet.

I claim:

1. A receptacle pocket controller diverter for a high speed front/back item reader sorter comprising:
   means providing oppositely disposed item sorting pathways opening from a straight line linear pathway leading to individual item receiving receptacles,
   automatic movable diverter means for diverting items out of said straight line linear pathway into one or the other of two oppositely disposed receptacles,
   said diverter means including a gate formed by a pair of confronting, rigid, lightweight members,
   said confronting, rigid members being angled slightly towards each other,
   columnating means in the path of movement of said items for rigidifying said items as the items are fed to a selected receptacle,
   sensing means operably associated with said diverter means for indicating the presence or absence of an item at said diverter means,
   said diverter means supporting said sensing means in a fashion permitting the retention of the inner surfaces of said confronting wall members flush to enable the smooth passage of items,
   means coupled to said diverter means for moving said diverter means to a desired location effective to complete a path for said items from said linear straight line path to a selected receptacle, and
   means for sensing the relative position of said diverter means with respect to the straight line linear item pathway.

2. The invention in accordance with claim 1 wherein said means providing oppositely disposed item sorting pathways comprises a substantially flat, rigid, base member, having integral upstanding wall portions intermediate said diverter means defining portions of a linear as well as portions of oppositely disposed curvilinear item guiding pathways.

3. The invention in accordance with claim 1 wherein said columnating means includes roller means in the path of movement of said items for contacting the edge portions of each item and means intermediate said roller means for deflecting the center portion of each item away from the edge portions effectively rigidifying the items as they are fed therepast.

4. The invention in accordance with claim 3 wherein said means intermediate said roller means is an integral shaped element curvilinearly configured to cause said item to conform to a bowed condition.

5. The invention in accordance with claim 1 wherein said sensing means is carried by said diverter means and comprises a phototransistor receptor located in one confronting wall and a light emitting diode emitter located in the opposite confronting wall, the walls of said diverter means being sufficiently thin so as to permit the light emitted from the diode to penetrate the wall and impinge upon the phototransistor receptor disposed in the opposite wall.

6. The invention in accordance with claim 1 or 5 wherein said movable diverter means comprises a stepper motor having its output shaft secured to the diverter means effective to move the diverter means arcuately to various positions permitting items to be diverted into specific receptacles.

7. A front/back stacker receptacle control module for high speed reader/sorter apparatus comprising:
 a base member providing mounting means for item drive means associated with said apparatus,
 said base member comprising a unitary, demountable, structurally rigid assembly, including integral means for locating two or more such assemblies contiguous to one another effective to provide a linear item pathway therethrough,
 means on said base member providing oppositely disposed item diverting pathways for operative association with individual item stacker receptacles,
 item columnating means operably associated with said item diverting pathways for columnating entering items,
 item diverting means operably associated with means providing said item diverting pathways effective to divert incoming items from a linear, straight line path of movement to an angular path of movement effective to cause said items to enter one or the other of two oppositely disposed front back stacker pocket receptacles,
 said item diverting means including a gate formed by a pair of confronting, rigid, lightweight members,
 drive means for selectively moving said item diverting means from one path of movement to another, and
 means operably associated with said diverting means for indicating the relative position of said diverting means with respect to either the front or the back stacker receptacle pathway or the straight through pathway.

8. The invention in accordance with claim 7 wherein said base member comprises a rigid metal-glass filled plastic casting provided with adjacent, contiguous oppositely disposed integral upstanding wall forming structures oriented so as to provide linear and curvilinear item pathways and including integral idler roller mounting means.

9. The invention in accordance with claim 7 wherein said indicating means comprises emitter/receptor means operably associated with said drive means including means occluding the recptor/emitter light path effective to indicate the open pathway for said item.

10. A front/back stacker for high speed reader/sorter apparatus comprising:
 demountable means providing a plurality of curvilinear oppositely disposed item guiding pathways for directing item/documents into a selected receiving pocket or receptacle operably associated therewith or to a straight line linear pathway;
 item diverting means located relative to said pathways and operably positionable effective to cause said items to enter a selected one of said pathways or to pass on into said straight line pathway;
 means for moving said diverting means in response to pocket identification signals derived from an item so as to position said diverting means in a selected open pocket position presenting an unobstructed pathway for said items either into a pocket receptacle or into the straight line linear pathway;
 means for indicating out of a total number of available pocket indications which pocket has been selected for receiving an item;
 first sensing means at the entering end of each item guiding pathway for sensing the location of an item so as to prevent item overlap, double items and the absence of items; and
 second sensing means integral with said diverting means for sensing the presence of an item at the diverting means indicating that the item is entering the selected pocket to which it has been directed or the linear pathway to the next adjacent front/back stacker.

11. The invention in accordance with claim 10 wherein said means providing oppositely disposed item guiding pathways further comprises a substantially right angled pathway in opposition to an obtuse angled pathway opening out from a straight line item path of movement.

12. The invention in accordance with claim 10 wherein said first sensing means further comprises a light emitting diode positioned in one wall of said item diverting means and a photo-transistor positioned in the opposed confronting wall effective to detect item passage by the interruption of the light from the diode to the photo-transistor.

* * * * *